Figure 4:
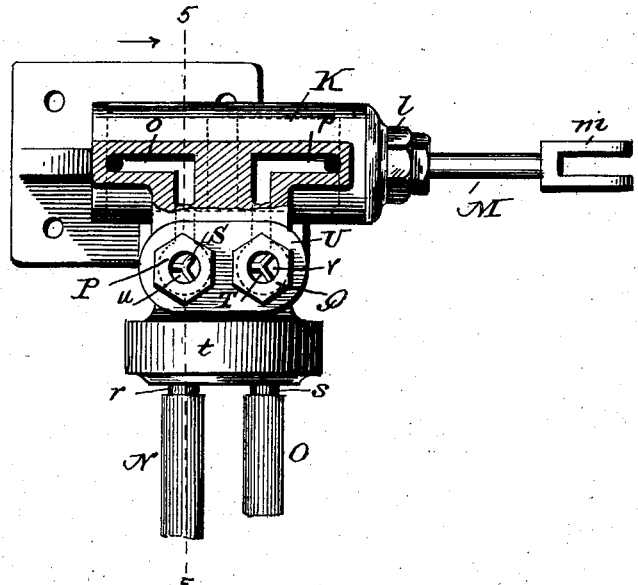

No. 742,135. PATENTED OCT. 20, 1903.
H. H. TAYLOR.
REFLECTOR FOR HEAD OR SEARCH LIGHTS.
APPLICATION FILED FEB. 3, 1903.
NO MODEL. 3 SHEETS—SHEET 1.
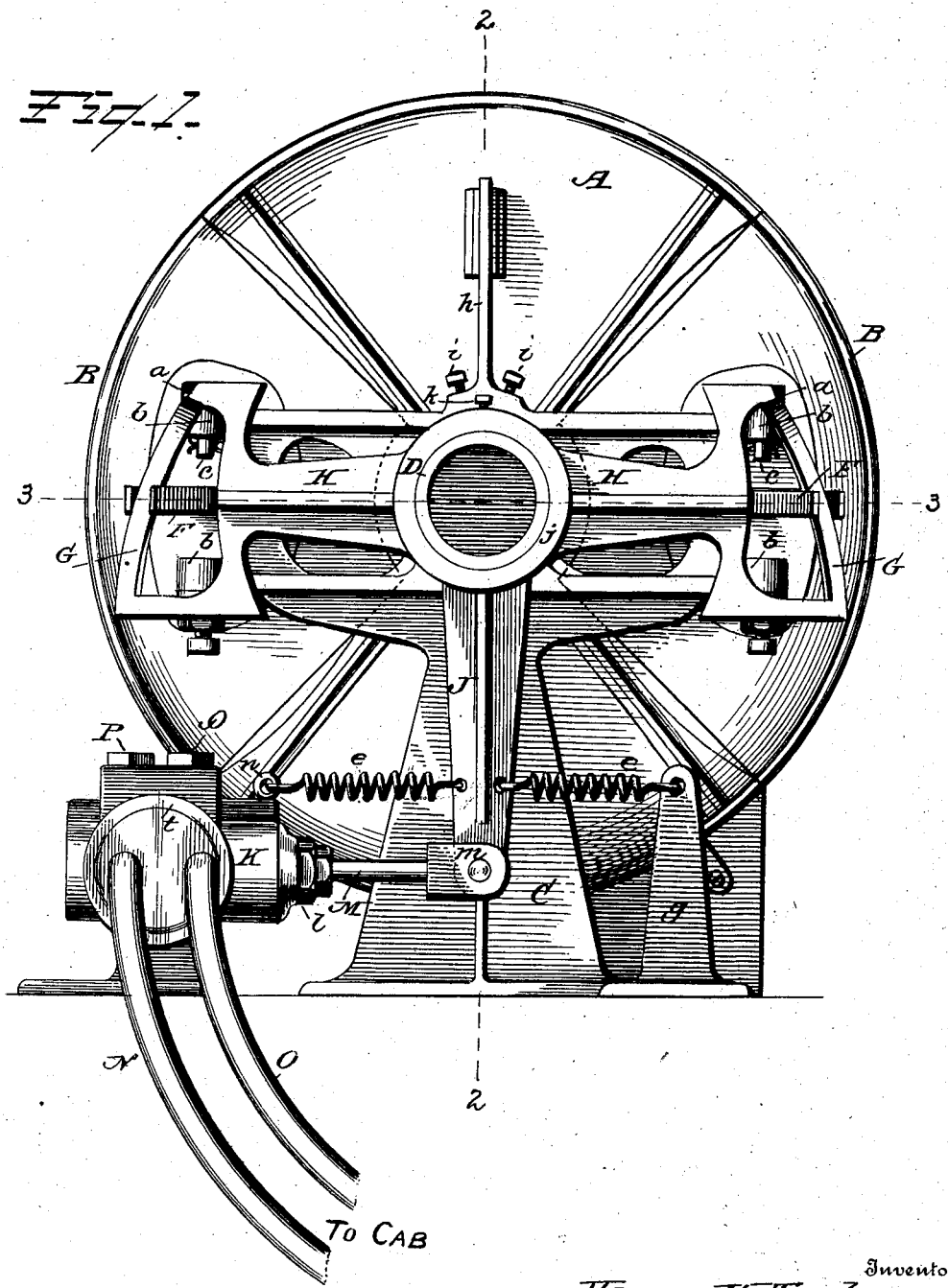
Witnesses
C. J. Williamson
M. E. Moore
Inventor
Horace H. Taylor.
per Chas. H. Fowler.
Attorney

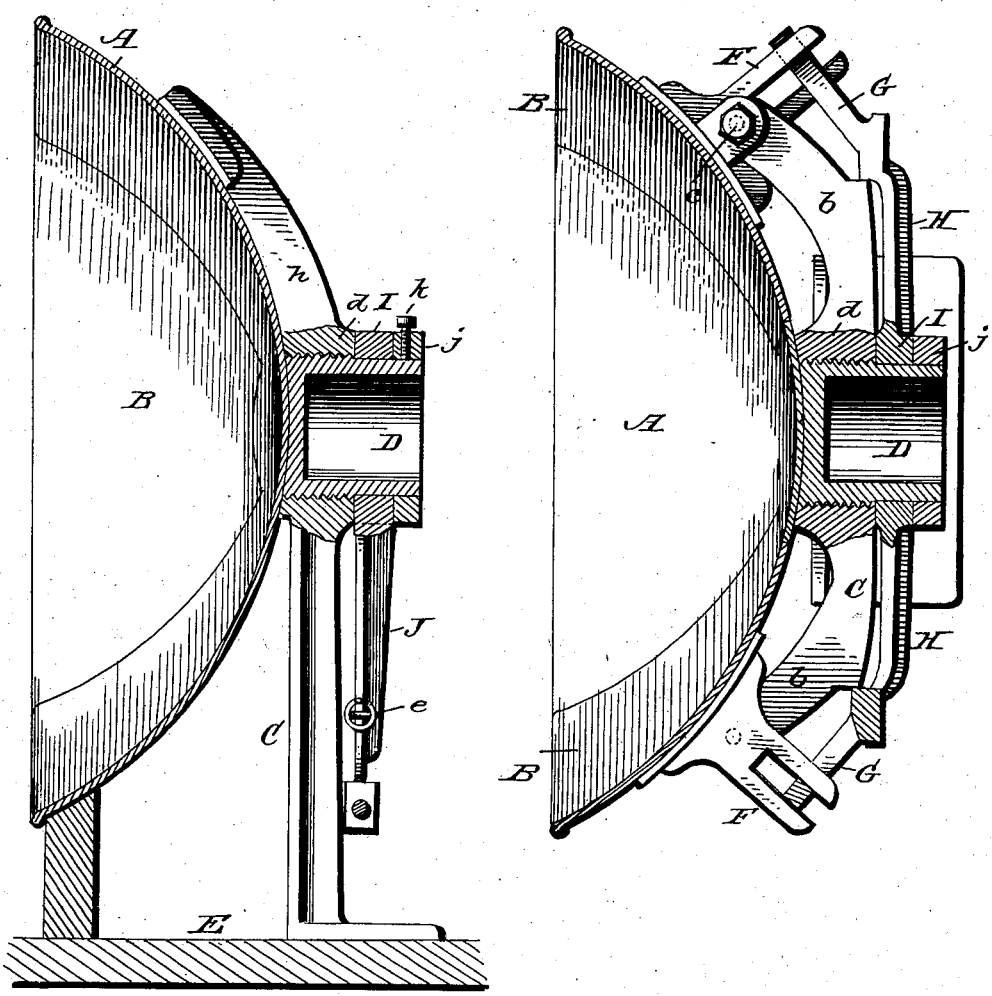

No. 742,135. PATENTED OCT. 20, 1903.
H. H. TAYLOR.
REFLECTOR FOR HEAD OR SEARCH LIGHTS.
APPLICATION FILED FEB. 3, 1903.

NO MODEL. 3 SHEETS—SHEET 3.

Inventor
Horace H. Taylor.
By Chas. H. Fowler
Attorney

Witnesses
G. J. Williamson
M. E. Moore

No. 742,135. Patented October 20, 1903.

UNITED STATES PATENT OFFICE.

HORACE H. TAYLOR, OF SAN JOSE, CALIFORNIA, ASSIGNOR OF ONE-HALF TO FRANK J. MAYHEW, OF SAN FRANCISCO, CALIFORNIA.

REFLECTOR FOR HEAD OR SEARCH LIGHTS.

SPECIFICATION forming part of Letters Patent No. 742,135, dated October 20, 1903.

Application filed February 3, 1903. Serial No. 141,631. (No model.)

*To all whom it may concern:*

Be it known that I, HORACE H. TAYLOR, a citizen of the United States, residing at San Jose, in the county of Santa Clara and State of California, have invented certain new and useful Improvements in Reflectors for Head or Search Lights; and I do hereby declare that the following is a full, clear, and exact description of the same, reference being had to the annexed drawings, making a part of this specification, and to the letters of reference marked thereon.

The present invention has relation to the mirrors or reflectors for head, search, or other lights which are adapted for use on locomotives, street and other cars, automobiles, and other vehicles or places where such a light would be found useful.

The object of the invention is to combine with a stationary mirror or reflector having a movable mirror or reflector section or member a suitable motor for operating the same, whereby the position of said movable section or member may be changed or adjusted with relation to the stationary mirror or reflector through the medium of the motor connected therewith to throw or project the rays of light in the desired direction.

The invention consists in a stationary mirror or reflector having one or more mirror or reflector sections or members which are movably connected thereto and a suitable motor and means connecting the same with the movable sections or members, substantially as shown in the drawings and hereinafter described and claimed.

Figure 5:
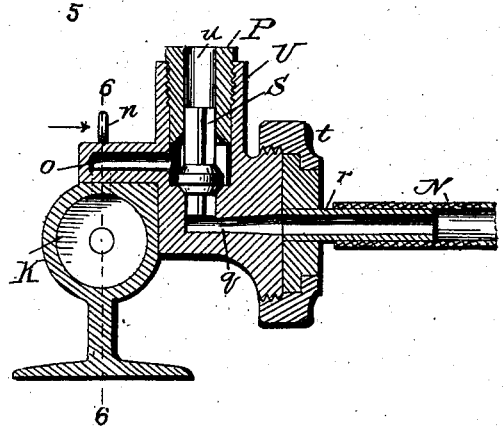
Figure 6:
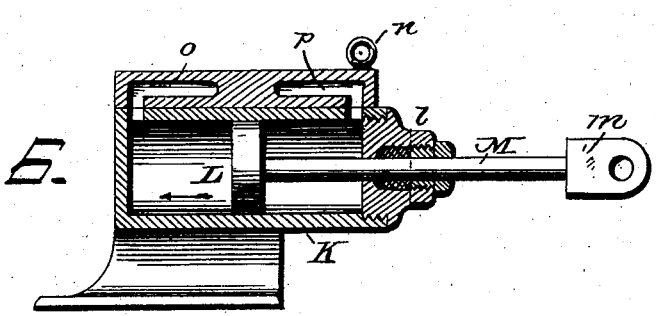

Figure 1 of the drawings is a rear elevation showing the back of the mirror or reflector and the motor connecting with the movable mirror or reflector sections or members for operating the same; Fig. 2, a vertical section of the mirror or reflector, taken on line 2 2 of Fig. 1; Fig. 3, a horizontal or transverse section taken on line 3 3 of Fig. 1; Fig. 4, a plan view of the motor, partly in horizontal section; Fig. 5, a sectional elevation taken transversely through the motor-cylinder on line 5 5 of Fig. 4; Fig. 6, a longitudinal sectional elevation through the motor-cylinder, showing the piston in elevation.

In the accompanying drawings, A represents a suitable mirror or reflector for head, search, or other lights, the same being supported in any preferred manner in an upright position, so that it will remain stationary and substantially immovable.

The mirror or reflector A is preferably concavo-convex in shape and has one or more spaces extending from its outer periphery or edge to near its center, gradually decreasing in width in a direction toward its center. These spaces, although substantially of fan shape, may be of any suitable form to correspond with the shape and form of the movable mirror or reflector sections or members B, which in the present instance are in the form of parte-sectors.

I do not wish to be understood as limiting my invention to any particular form or shape of the spaces and the movable sections fitting therein, as the same may be variously modified or changed without affecting the essential characteristics of my invention.

The movable sections B are so connected to the stationary mirror or reflector A as to be capable of adjustment to change their position with relation to the stationary mirror or reflector, so as to project the rays of light on the track or to one side of the track when used on locomotives or other like vehicles when passing curves on the track, or projecting the rays in any direction as found necessary.

The movable sections or members B may be adjustably connected to the mirror or reflector A in any desirable manner; but in the present instance I have shown the mirror or reflector supported by a suitable standard or frame C, the same being connected to a stationary base or other object, as shown at E in Fig. 2 of the drawings.

The movable mirror or reflector sections or members B have lugs $a$ projecting from the back thereof to enable a pivotal connection to be made between the section or member and the standard or supporting-frame C, said standard or frame having arms $b$, which are pivotally connected to the lugs by pins $c$.

Any suitable means may be provided for pivotally connecting the movable mirror or reflector sections or members to the standard or supporting-frame, as would be found best adapted to the purpose.

The stationary mirror or reflector is rigidly connected to a central hub D, which hub has exterior screw-threads thereon to engage an interior screw-threaded ring $d$, as shown in Fig. 2 of the drawings. This ring $d$ is a part of the standard or frame C and preferably integral therewith and connected, as hereinbefore stated, to a suitable base or other object, as indicated at E, and the standard or frame has suitable arms $h$, to which the stationary mirror or reflector is secured, or other suitable means may be provided for this purpose.

Upon the back or rear side of the movable mirror or reflector sections B are bifurcated or slotted brackets F, which engage the cam devices G of any preferred construction, said cam devices projecting from the outer ends of suitable arms H, which arms in turn project from a central collar I, movable upon the hub D, as shown in Fig. 3 of the drawings. The collar I is held upon the hub D by a ring $j$, which ring is retained upon the hub by a set-screw $k$ or by any other preferred and well-known means, the movement of the depending lever J also turning the collar upon the hub, and through the cam devices engaging the bifurcated or slotted brackets hereinbefore described the movable mirror or reflector sections or members may be adjusted to vary their position with relation to that of the stationary mirror or reflector.

The adjustment of the mirror or reflector sections or members through the action of the depending lever is attained by means of the cam devices moving with said lever, the bifurcated or slotted brackets to which the sections or members are attached and which engage the cam devices, and the pivoting of the sections or members with the standard or supporting-frame, all of which are essential in the construction herein shown, but may be variously changed or modified.

The construction of the stationary mirror or reflector and the movable mirror or reflector sections or members and the several connections and devices hereinbefore described are substantially the same as shown, described, and claimed in my application filed November 5, 1902, Serial No. 130,163, and therefore I do not claim, broadly, in the present application any of the features thereof, but only in connection with the means employed for controlling the movement of the mirror or reflector sections or members. Therefore any suitable mirror or reflector that has one or more adjustable or movable mirror or reflector sections or members may be substituted for the mirror or reflector shown and herein described, which, in connection with a suitable motor and intermediate means connecting the motor with the movable sections or members, embodies the essential features of the invention.

A suitable motor connects with the movable mirror or reflector sections for the purpose of operating them, said motor in the present instance comprising the cylinder K, in which works the piston-head L, to which is connected the piston-rod M. The piston-rod M passes through a stuffing-box $l$ at the end of the cylinder K and has upon its outer end a perforated yoke $m$ for pivotally connecting it to the lower end of the lever J. The piston-rod may be pivotally connected to the lever in any suitable manner found desirable, the means shown being one of many that may be resorted to for making the desired connection between the rod and lever, and, if preferred, suitable springs $e$ may be employed to render the lever spring-actuating in addition to the movement imparted thereto by the motion of the piston. These springs may be spiral or other form and are connected to the lever upon each side thereof and their outer ends to a suitable fastening $n$ upon the motor-cylinder and to a short post $g$, as shown in Fig. 1 of the drawings. The cylinder K has the usual ports $o$ $p$, which ports communicate with the interior of the motor-cylinder K and also communicate with the inlet or supply ports $q$, respectively, said ports having suitable pipes $r$ $s$, to which are connected rubber tubes N O, leading to the cab of the locomotive and connecting with a supply tank or reservoir of air, steam, or other motive power, as may be desired. The pipes $r$ $s$ are connected to a screw-cap $t$ by any suitable means found best adapted to the purpose, said cap being in turn connected to the motor, as shown in Fig. 5 of the drawings. The ports $o$ $p$ not only communicate with the motor-cylinder K upon either side of the piston-head L and with the two inlet or supply ports $q$, but communicate, respectively, with the two exhaust-ports $u$ $v$, which discharge into the atmosphere. The exhaust-ports $u$ $v$ extend through the tubular valve-seats P Q, respectively, suitable valves S T alternately closing said ports by the pressure thereon of the air or other motive power used. The valve-seats have exterior screw-threads which engage interior screw-threaded openings in the valve-chest U, thereby enabling the seats to be adjusted as desired.

The motor herein described is designed to be operated by air as a motive power; but it is evident that water or steam may be substituted, and, if desired, electricity may be used to impart to the rod M the required reciprocating motion, as I do not wish to be understood as limiting my invention to any special construction of motor, or, in fact, any means may be employed for imparting to the rod the motion required to operate the depending lever J, which connects with the movable mirror or reflector section or member B, one or more of said sections being used in connection with the stationary mirror or reflector, as found preferable.

I have only shown one of many means for imparting to the rod M the required motion, and where the rod is used independent of a motor it would have no piston-head, but simply a pitman or rod to form a connection between the same and the lever, and in such case other means would be employed for connecting with the rod to give the motion thereto. It should therefore be understood that with a stationary mirror or reflector for head or other lights having a mirror or reflector section or member in connection with means for operating said section or member is the essential feature of my invention, and I therefore have shown one of many means that may be employed for this purpose.

By means of a motor or other like device connecting with the headlight the angle of the movable reflector-section may be controlled with relation to the stationary reflector by the engineer in the cab of the locomotive, and by means of the rubber or elastic tubes connecting the supply-reservoir with the motor enables the reflector and its connections to be removed when found necessary to clean and polish the reflector, this being accomplished by first disconnecting the elastic tubes from the motor. When the reflector is not in use on a curve, there is no air in the cylinder of the motor. The springs connecting the depending lever of the movable reflector-section will therefore retain the movable reflector-section in its normal position and the light projected straight ahead.

When the light is required to be thrown to the right side of the track, air or other motive power used is allowed to pass in contact with the proper one of the valves in the motor, which will force it upward against the valve-seat and allow the air or other motive power to pass into the cylinder behind the piston and forcing the same in the direction of the arrow in Fig. 6 of the drawings, and thereby expelling the air in the cylinder in front of the piston out through the discharge. The moment the pressure on the piston is lowered by the escape of air or other motive power at the relief-valve in the cab of the locomotive the valve that was previously closed against its seat at the back of the piston will drop to its lower seat, and the spring connecting the depending lever of the movable reflector-section will bring the piston back to the center of the cylinder, as shown in Fig. 6 of the drawings.

Having now fully described my invention, what I claim as new, and desire to secure by Letters Patent, is—

1. A stationary reflector for head, search, or other light, and a movable reflector-section, a depending lever connecting therewith, a rod pivotally connecting with the lever, and means for imparting motion to said rod, substantially as and for the purpose described.

2. A stationary reflector for head, search, or other light, and a pivoted reflector-section, a suitable cam device, a lever connecting with the section, and a rod pivotally connecting with the lever, and means for imparting motion to said rod, substantially as and for the purpose specified.

3. A stationary reflector for head, search, or other light, and a movable reflector-section, and means for adjusting the position of said section with relation to the stationary reflector, said means comprising a suitable motor, the same connecting with the movable section by which the motion thereof is controlled, substantially as and for the purpose set forth.

4. A stationary reflector for head, search, or other light, and a movable reflector-section connected thereto, a suitable motor and a piston therefor, said piston connecting with the movable reflector-section whereby the same may be operated, substantially as and for the purpose described.

5. A stationary reflector for head, search, or other light, and a movable reflector-section connected thereto, and a suitable motor consisting of a cylinder, a piston movable therein, supply or inlet ports, and ports to conduct the motive power to both sides of the piston-head, suitable exhaust-ports, and valves controlling the same, the rod of said piston connecting with the reflector-section whereby the same is operated, substantially as and for the purpose specified.

In testimony whereof I affix my signature in presence of two witnesses.

HORACE H. TAYLOR.

Witnesses:
 W. F. LILLICK,
 G. P. BURKETT.